(12) United States Patent
Tu

(10) Patent No.: US 7,247,668 B2
(45) Date of Patent: Jul. 24, 2007

(54) CURABLE COATING COMPOSITION, METHOD FOR MAKING A COATED METAL PLATE HAVING THE COATING COMPOSITION AND THE COATED METAL PLATE MADE THEREBY

(75) Inventor: Chia-Lun Tu, Kaohsiung (TW)

(73) Assignee: Yung Chi Paint & Varnish Mfg. Co., Ltd., Kaosiung (TW)

( * ) Notice: Subject to any disclaimer, the term of this patent is extended or adjusted under 35 U.S.C. 154(b) by 249 days.

(21) Appl. No.: 10/919,780

(22) Filed: Aug. 16, 2004

(65) Prior Publication Data

US 2005/0043465 A1    Feb. 24, 2005

(30) Foreign Application Priority Data

Aug. 18, 2003   (TW) .............................. 92122600 A

(51) Int. Cl.
*C08K 5/01* (2006.01)

(52) U.S. Cl. ...................................... 524/487; 524/360
(58) Field of Classification Search ................ 524/360, 524/487

See application file for complete search history.

(56) References Cited

U.S. PATENT DOCUMENTS 5,470,897 A * 11/1995 Meixner et al. ............ 523/518

* cited by examiner

*Primary Examiner*—Edward J. Cain
(74) *Attorney, Agent, or Firm*—Merchant & Gould P.C.

(57) ABSTRACT

A curable coating composition includes a polyester, a curing agent for curing the polyester, a curing catalyst, a composite solvent having at least two solvents with different dissolving powers for the polyester, and a wax incompatible with the polyester. A method for making a coated metal plate having an embossment-like texture formed from the coating composition, and the coated metal plate made thereby are also disclosed.

11 Claims, 2 Drawing Sheets

CURABLE COATING COMPOSITION, METHOD FOR MAKING A COATED METAL PLATE HAVING THE COATING COMPOSITION AND THE COATED METAL PLATE MADE THEREBY

CROSS-REFERENCE TO RELATED APPLICATION

This application claims priority of Taiwanese application No. 092122600, filed on Aug. 18, 2003.

BACKGROUND OF THE INVENTION

1. Field of the Invention

The invention relates to a coating composition, more particularly to a curable coating composition. This invention also relates to a method for making a coated metal plate having an embossment-like texture formed from the coating composition, and to a coated metal plate having an embossment-like texture made by the method.

2. Description of the Related Art

There are two conventional methods for making a metal plate or roll having embossed patterns, which are stereo-patterns recognizable by the naked eye. One of the conventional methods includes the steps of applying to a metal plate a coating of thermoplastic polyvinyl chloride (PVC) in a thickness of about 200 um, hot-pressing the coating by using an embossing roller, and quenching the coated metal to form an embossed pattern on the metal plate. However, the aforesaid conventional method has the following disadvantages:

1) The PVC coating typically includes a plasticizer, such as dioctyl phthalate or tricresyl phosphate, which is prone to migration and hence environmental pollution. The use of the plasticizer is likely to be regulated in the very near future.

2) In order to conduct the hot pressing, the coating should be as thick as 200 um, which in turn increases the production costs.

3) The embossed pattern of the coating is liable to vanish when subjected to heat or stress. Furthermore, when the coated metal plate product is used outdoors, the coating is liable to degrade due to light and heat. Therefore, the metal plate product is not useful at high temperatures.

The other one of the conventional methods includes the steps of gluing an embossed and patterned PVC sheet to a metal substrate, and pressing the PVC sheet against the metal substrate to make a metal plate or roll having embossments. Since polyvinyl chloride is also used in this method, the aforesaid disadvantages are also encountered. Additionally, since a series of steps are required to adhere the PVC sheet to the metal substrate, production is relatively complicated and expensive. Furthermore, the PVC sheet is monotonous in color so that the appearance of the product has limited variety.

SUMMARY OF THE INVENTION

An object of the present invention is to provide a curable coating composition which can form embossments on the surface thereof so as to overcome the aforesaid disadvantages of the prior art.

Another object of this invention is to provide a method for making a coated metal plate having an embossment-like texture formed from the coating composition.

A further object of this invention is to provide a coated metal plate having an embossment-like texture made by the method.

According to the first aspect, the present invention provides a curable and embossment-formable coating composition including a polyester, a curing agent for curing the polyester, a composite solvent having at least two solvents with different dissolving powers for the polyester, and a wax incompatible with the polyester.

Due to the different dissolving powers of the composite solvent for the polyester, when the coating composition is applied to a base film or a primer coating, differential interface tension will occur between the layer of the coating composition and the primer coating so that the coating composition cannot be completely leveled on the primer coating. The incomplete leveling results in unevenness on the surface of the coating composition. The effect of unevenness is enhanced by the incompatibility of the polyester and the wax so that a clear embossment-like texture is produced when the coating composition is cured.

The size and shape of the grains in the embossment-like texture may be controlled or adjusted by varying the type of the composite solvent, the type of the wax, and the percentages of the components contained in the coating composition.

According to the second aspect, the present invention provides a method for making a coated metal plate having an embossment-like texture. The method includes the steps of:

(i) applying to a metal plate a polyester-based primer coating to form a base film;

(ii) applying a coating composition on the base film to form a top film, the coating composition including a polyester, a curing agent for curing the polyester, a composite solvent including at least two solvents having different dissolving powers for the polyester, and a wax incompatible with the polyester; and (iii) heating the metal plate after the step (ii) to cure the coating composition.

According to the third aspect, the present invention provides a coated metal plate having an embossment-like texture made by the method.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
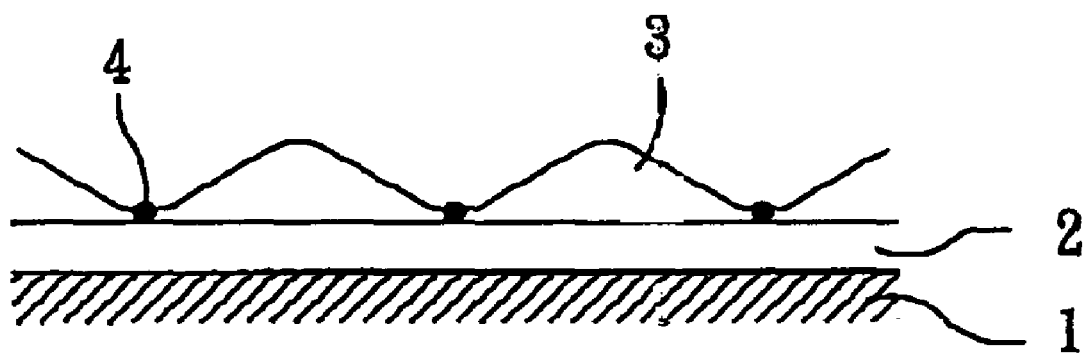
FIG. 1 is a schematic view illustrating a metal plate coated with the preferred embodiment of a curable and embossment-formable coating composition according to this invention prior to curing of the coating composition.
Figure 2:
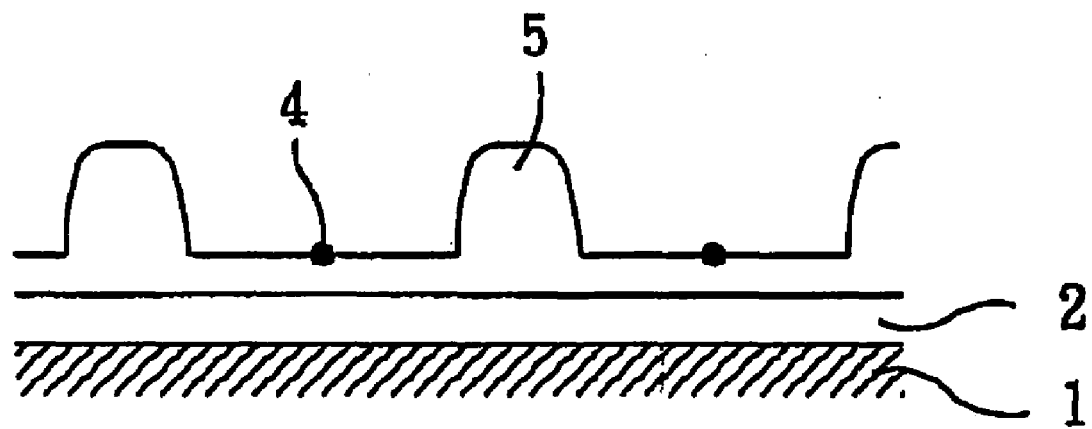
FIG. 2 is a schematic view similar to FIG. 1, but illustrating the coating composition of the preferred embodiment when cured.

Referring to FIGS. 1 and 2, the preferred embodiment of the curable coating composition 3 is applied on a base film 2 on a metal plate 1, as best shown in FIG. 1. After the coating composition 3 is cured, the metal plate 1 has an embossment-like texture 5 as shown in FIG. 2.

The coating composition 3 includes a polyester as a main component, a curing agent for curing the polyester, a curing catalyst, a composite solvent, and a wax 4 incompatible with the polyester. The composite solvent includes at least two solvents having different dissolving powers for the polyester so that when the coating composition 3 is applied to the surface of the metal plate 1, the coating composition 3 can not be completely leveled as shown in FIG. 1. Furthermore, since the wax 4 is incompatible with the polyester, it can produce embossment-like grains on the surface of the metal plate 1 as shown in FIG. 2.

Preferably, the composite solvent includes a cyclic ketone and an aromatic solvent. Preferably, the cyclic keton is cyclohexanone, and the aromatic solvent is a $C_{9-12}$ aromatic hydrocarbon having a boiling point ranging from 192 to 207° C. (e.g., S150 commercially available from Chinese Petroleum Corp.), a $C_{9-12}$ aromatic hydrocarbon having a boiling point ranging from 226 to 285° C. (e.g., S200 commercially available from Chinese Petroleum Corp.), or mixtures thereof. More preferably, the aromatic solvent is S200.

The wax suitable for this invention is a polyethylene wax, a polypropylene wax, or mixtures thereof. More preferably, the wax is a polypropylene wax.

Preferably, the polyester has a weight average molecular weight ranging from 2000 to 8000, a hydroxyl value ranging from 5 to 40, and an acid value of less than 3.

The curing agent suitable for use in this invention is polyamine, an isocyanate compound, or mixtures thereof. More preferably, the curing agent is melamine.

The curing catalysts usable in the present invention are low acidic catalysts. Examples of the curing catalysts are sulfophenyl-containing sulfonic acids, such as p-toluenesulfonic acid, dinonyl sulfonic acid, and mixtures thereof. Preferably, the curing catalyst is p-toluenesulfonic acid.

The percentages of the polyester, the curing agent, the curing catalyst, the composite solvent, and the wax may be 70-80 wt %, 6-10 wt %, 0.5-1.0 wt %, 13.3-25 wt %, and 0.2-0.5 wt %, respectively, based on the total weight of the coating composition.

The coating composition according to the present invention may be prepared by any suitable means well-known in the art, such as by blending together the aforesaid components.

The amounts of the components of the coating composition 3 may be selected depending on the specific pattern required to be formed on the coated metal plate. Furthermore, the conventional additives, such as metallic pigment, spacer, and the like, may be optionally added to the coating composition 3 so as to enhance the pattern and texture provided by the coating composition 3.

The preferred embodiment of the method for making a coated metal plate having an embossment-like texture according to this invention includes the steps of:

(i) applying to the metal plate 1 a polyester-based primer coating in a predetermined thickness to form the base film 2;

(ii) applying the curable coating composition 3 in a predetermined thickness on the base film 2 to form a top film; and (iii) heating the metal plate 1 after the step (ii) to cure the curable coating composition 3 so as to make the coated metal plate having an embossment-forming film.

The material suitable for use as the polyester-based primer coating includes a polyester having a relatively high molecular weight as a primary component. Preferably, the material used as the polyester-based primer coating is a modified curable coating including:

(a) polyester having a molecular weight ranging from 10000 to 20000, a hydroxyl value ranging from 10 to 40, and an acid value of no more than 5;

(b) methylated polyamine and isocyanate, which are used as a curing agent;

(c) di-n-butyltin laurate, which is used for catalyzing the isocyanate and for improving adhesion and anti-corrosion properties for the metal plate 1;

(d) p-toluenesulfonic acid, which is used for catalyzing the methylated polyamine; and (e) a true solvent (composed of a single-component solvent or two or more solvents which are miscible with each other) to ease complete leveling of the primer coating, such as aromatic solvent, ester, and ketone, which are used individually.

Additionally, following the concept used in preparing the coating composition 3, a suitable conventional additive, such as a teflon wax, a polypropylene wax, or a polyethylene wax, may be optionally added to the polyester-based primer coating to adjust the interface tension between the base film 2 and the top film formed from the coating composition 3 so as to enhance the formation of the embossment-like texture. Furthermore, pigment and anticorrosion agent may be added as desired. The primer coating can be prepared by any suitable means well-known in the art.

Preferably, the step (iii) is conducted at a temperature ranging from 210 to 250° C. The time for heating in the step (iii) preferably ranges from 20 seconds to 5 minutes.

The total thickness of the metal plate 1, the base film 2, and the top film formed from the coating composition 3 is not more than 25 um. More preferably, the thickness of the base film 2 ranges from 12 to 20 um.

The metal plate used in this invention may be a copper plate, a galvanized steel plate, a galvalume steel plate, or a stainless steel plate.

The following Examples are for illustrative purposes only and are not to be construed as limiting the scope of the present invention in any manner whatsoever.

EXAMPLE

Figure 3:
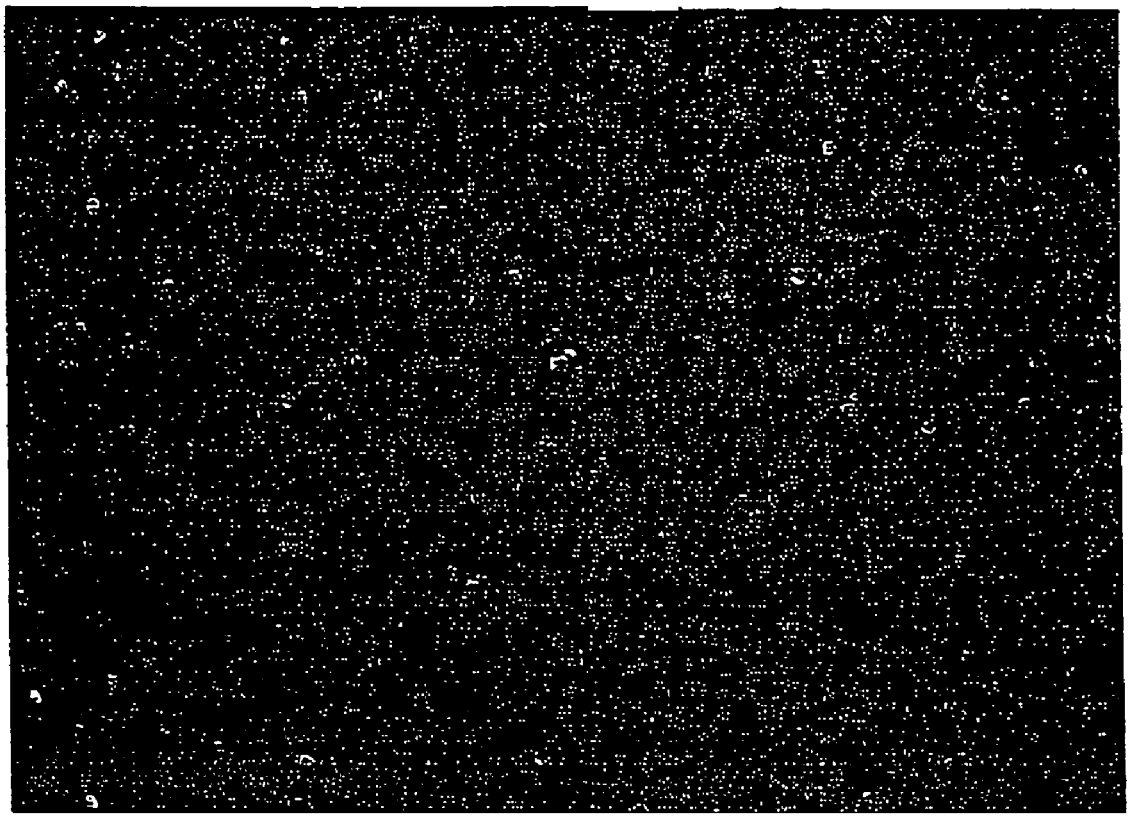
FIG. 3 is a microscopic photograph of the cured coating composition on the metal plate.

The components and the amounts thereof (in wt %) listed in Table 1 are used to prepare the coating composition 3 and the primer coating, which are then used to make the coated metal plate according to the method of the present invention. The primer coating is applied in a thickness of 12 um to a galvalume steel plate 1 having a thickness of 0.476 mm to form a base film 2 on the steel plate 1. The coating composition 3 is then applied in a thickness of 7 um to the base film 2 to form a top film. The steel plate 1 coated with the base film 2 and the top film is cured in an oven at a temperature of 210-250° C. for a period of 20 seconds to 5 minutes to form a coated metal plate having an embossment-like texture. A microscopic photograph of the coated metal plate is shown in FIG. 3 (×2). The physical properties of the coated metal plate are shown in Table 2.

TABLE 1

| Coating composition | | Primer coating | |
| --- | --- | --- | --- |
| Components | Wt % | Components | Wt % |
| Polyester resin[a] | 75.0 | Polyester resin[b] | 50.0 |
| Melamine | 8.0 | Melamine | 5.5 |
| Cyclohexanone | 5.0 | Isocyanate | 2.0 |
| S200 | 5.5 | S200 | 8.8 |
| P-toluensulfonic acid | 1.0 | P-toluensulfonic acid | 0.5 |
| Polypropylene wax 4 | 0.5 | Teflon wax 4 | 1.0 |
| Silver paste | 5.0 | Acrylic leveling agent | 0.6 |
| | | Acrylic defoaming agent | 0.6 |
| | | Pigment | 30 |
| | | Matting agent (Silicon Dioxide) | 1.0 |

[a] a branched polyester for clear lacquer, manufactured by Yung Chi Paint & Varnish MFG. Co., Ltd., Model# PF-101
[b] a long-chain polyester for primer, manufactured by Yung Chi Paint & Varnish MFG. Co., Ltd., Model# E-760

TABLE 2

| Test Items | | Measure methods | Evaluation | Result |
|---|---|---|---|---|
| T-BEND/Adhesion | | ASTM4145 | | 2 T/0 T |
| Pressure | 6 mm | Alison | Cracking | No |
| Test | Adhesion | Tester | Tape off | No |
| Impact | ECCA | ASTM D2794 | Cracking | No |
| Resistance | Adhesion | | Tape off | No |
| Pencil Hardness | | ASTM D3363 | Scratch | 5 H (no) |
| Gloss | | ASTM D623 | 60° | 34% |
| Chemical Resistance (24° C., 24 hr) | 5% NaOH | ASTM D1308 | Blister | No |
| Solvent Resistance MEK (times) | | ASTM D5402 | Double rubbing | 50 times |
| Moisture Resistance | Edge | JIS K 5400 | Edge corrosion | 0 mm |
| | Flat | | Surface condition blistering | No |
| | Scribe | | Scribe corrosion | 0 mm |
| Salt Spray Test | Edge | ASTM B117 | Edge corrosion | 2 mm |
| | Flat | | Surface condition blistering | No |
| | Scribe | | Scribe corrosion | 0 mm |
| Surface Condition | | | Embossment pattern | |
| Abrasion Resistance | | | | Excellent |
| 2 hr | Blister | | Blister | No |
| Boiling | Gloss | | 60° | 33% |
| | T-bend | | Tape off | No |

In view of the aforesaid, since the coating composition of this invention does not include any plasticizer which is required in the prior art, the disadvantages attributed to the use of the plasticizer can be eliminated. Furthermore, as compared to the prior art, the thickness of the coating composition of this invention is relatively small, thus reducing the manufacturing costs. Moreover, the color of the coating composition can be changed easily as desired by adding a pigment to the coating composition.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A curable coating composition capable of forming an embossment-like texture, comprising:
   a polyester;
   a curing agent for curing said polyester;
   a composite solvent including at least two solvents having different dissolving powers for said polyester; and
   a wax incompatible with said polyester,
   wherein said composite solvent includes a cyclic ketone and an aromatic solvent.

2. The curable coating composition as claimed in claim 1, wherein said cyclic ketone is cyclohexanone.

3. The curable coating composition as claimed in claim 1, wherein said aromatic solvent is selected from the group consisting of a $C_{9-12}$ aromatic hydrocarbon having a boiling point ranging from 192 to 207° C., and a $C_{9-12}$ aromatic hydrocarbon having a boiling point ranging from 226 to 285° C.

4. The curable coating composition as claimed in claim 1, wherein said wax is selected from the group consisting of a polyethylene wax and a polypropylene wax.

5. The curable coating composition as claimed in claim 1, wherein said polyester has a weight average molecular weight ranging from 2000 to 8000, a hydroxyl value ranging from 5 to 40, and an acid value of less than 3.

6. A curable coating composition capable of forming an embossment-like texture, comprising:
   a polyester;
   a curing agent for curing said polyester;
   a composite solvent including at least two solvents having different dissolving powers for said polyester; and
   a wax incompatible with said polyester,
   wherein said curing agent is selected from the group consisting of polyamine and an isocyanate compound.

7. A curable coating composition capable of forming an embossment-like texture, comprising:
   a polyester;
   a curing agent for curing said polyester;
   a composite solvent including at least two solvents having different dissolving powers for said polyester; and
   a wax incompatible with said polyester.
   wherein said curing agent is melamine.

8. A curable coating composition capable of forming an embossment-like texture, comprising:
   a polyester;
   a curing agent for curing said polyester;
   a composite solvent including at least two solvents having different dissolving powers for said polyester;
   a wax incompatible with said polyester; and
   a curing catalyst.

9. The curable coating composition as claimed in claim 8, wherein said curing catalyst is a sulfophenyl-containing sulfonic acid.

10. The curable coating composition as claimed in claim 9, wherein said curing catalyst is selected from the group consisting of p-toluenesulfonic acid and dinonyl sulfonic acid.

11. The curable coating composition as claimed in claim 8, wherein the percentages of said polyester, said curing agent, said curing catalyst, said composite solvent, and said wax are 70-80 wt %, 6-10 wt %, 0.5-10 wt %, 13.3-25 wt %, and 0.2-0.5 wt %, respectively, based on the total weight of said curable coating composition.

* * * * *